United States Patent [19]

Nagao

[11] 4,274,710
[45] Jun. 23, 1981

[54] OPTICAL WAVE CIRCULATORS

[76] Inventor: Tsukasa Nagao, 4-75, Mabori, Yokosuka-shi, Kanagawa-ken, Japan

[21] Appl. No.: 145,896

[22] Filed: May 2, 1980

[30] Foreign Application Priority Data

May 8, 1979 [JP] Japan ................................. 54/55933

[51] Int. Cl.³ ............................................. G02B 27/00
[52] U.S. Cl. .................................. 350/375; 350/96.13
[58] Field of Search ............ 350/150, 151, 157, 96.13, 350/96.14; 333/1.1

[56] References Cited

U.S. PATENT DOCUMENTS 4,153,328  5/1979  Wang ................................. 350/96.13
4,221,460  9/1980  Hepner et al. ...................... 350/96.13

Primary Examiner—R. A. Rosenberger
Attorney, Agent, or Firm—Spensley, Horn, Jubas & Lubitz

[57] ABSTRACT

A three port optical wave circulator, comprising a cylindrical structure made of magneto-optic material which is optically anisotropic in a biasing magnetic field, for selectably transmitting a light beam incident to a port on the cylinder surface in a direction plus or minus 120° from the incident direction. In the presence of a selected biasing magnetic field, a light beam incident to any port of the circulator is uniformly transmitted in the selected direction to a second port.

8 Claims, 20 Drawing Figures

FIG. 4
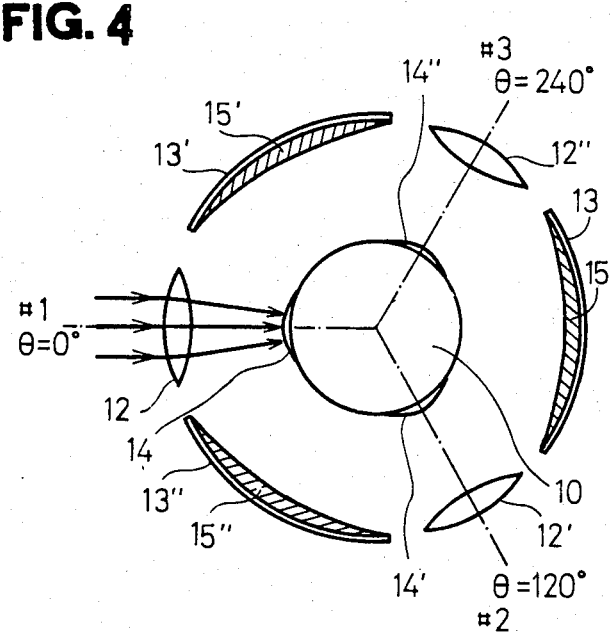
FIG. 5
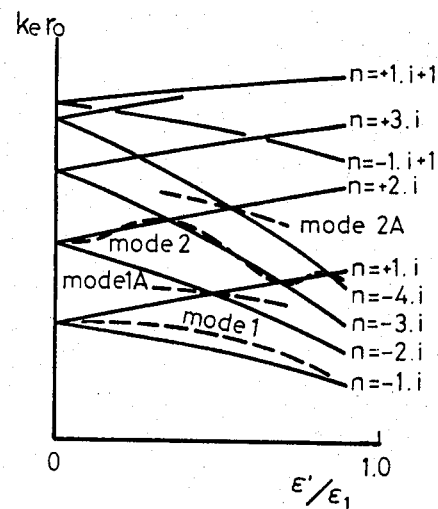
FIG. 6
| | Forward circulation (+) | opposite circulation (−) | contributing (resonant) modes |
|---|---|---|---|
| mode 1 | | | $n = +1.i$ <br> $n = -1.i$ |
| mode 1A | | | $n = +1.i$ <br> $n = -2.i$ |
| mode 2 | | | $\begin{cases} n = +2.i \\ n = -2.i \end{cases}$ <br> $\begin{cases} n = +2.i \\ n = -3.i \end{cases}$ |
| mode 2A | | | $n = +2.i$ <br> $n = -4.i$ |

OPTICAL WAVE CIRCULATORS

BACKGROUND AND SUMMARY OF THE INVENTION

This invention provides an optical-wave circulator (OW circulator) that can be used indispensably in optical communication.

As is well known, a circulator, acting as a nonreciprocal element, has developed in microwaves, and so various types of the circulator are nowaday available. In the optical region, OW circulator which is adapted for the optical communication use has not been realized yet. There are technical difficulties in production of an OW circulator. One difficulty is that if we can apply the design technique of the microwave circulator to the production of the OW circulator, we have to make the OW circulator in the order of one tenth the wavelength of the light wave, or that long, as so we do in the microwaves. After the analogy of the microwave circulator, the OW circulator is to be made so delicately in the order of no less than 0.1 microns, (as the light wavelength for the optical communication is as short as from 1.0 to 1.5 microns) that machining of a magneto-optic structure (MO structure) is extremely difficult, and even if the MO structure is made in success, coupling of the input and output signal transmission lines with that very fine MO structure is actually another problem, since a glass-fiber transmission line, having the diameter of 5 microns for single-mode transmission and that of more than 50 microns for multiple-mode transmission, must be coupled with the MO structure having the dimensions of less than one tenth the wavelength in diameter. And furthermore, such a fine MO structure is exposed to the incident laser light beam that may have far more intensive power density possibly to give rise to nonlinear effect and to disturb normal performance.

The basic principle of the invention originates from a unique idea different from that of the microwave circulator. In embodiments of the invention, an MO structure having large dimensions than the light wavelength is utilized and incorporated in circulator embodiments to take advantage of various magneto-optic effects: Faraday effect, Cotton-Mouton effect, and magneto-optic Kerr effect. The Faraday effect is a phenomenon that the plane of polarization of the incident linearly polarized light, in passing through the MO material along the direction of magnetization (which is called Faraday location), is rotated due to the difference of refractive indices for left and right circularly polarized light waves; the Cotton-Mouton effect is a phenomenon of double refraction that the incident light wave, passing in the direction normal to the magnetization (which is called Voigt location), are distinctively retarded with variations of refractive indices for the light waves of polarizations normal and parallel to the magnetization; and the MO Kerr effect is a phenomenon of rotation of the polarization for the light waves reflected from the surface of the MO material.

The MO material is defined as such that the Faraday effect, the Cotton-Mouton effect, or the MO Kerr effect acts with biasing magnetic field. The most useful MO material is crystaline rare earth iron garnet that may have large Faraday rotation and small absorption losses, that is, large figures of merits (the ratio of the Faraday rotating angle and absorption losses for unit length).

These MO effects in the MO material can be explained in terms of tensor permittivity and also the MO anisotropic splitting factor under the biasing magnetic field, which presents a contrast to ferromagnetic material in microwaves that can be explained in terms of tensor permeability and its anisotropic splitting factor under the biasing magnetic field. The tensor permittivity is written by $$[\epsilon] = \begin{pmatrix} \epsilon_1 & j\epsilon' & 0 \\ -j\epsilon' & \epsilon_1 & 0 \\ 0 & 0 & \epsilon_0 \end{pmatrix}$$

and $\epsilon'/\epsilon_1$ is the MO anisotropic splitting factor. The ratio of $\epsilon'/\epsilon_1$ is far below the value of the ferromagnetic anisotropic splitting in the microwaves. The distinction between them is conspicuously essential. Underlying ideas in the invention are that light waves have shorter wavelength than the dimensions of the MO structure used, coupling between the light waves and MO material is not sufficiently strong, and therefore various MO effects should be turned to advantage.

The embodiments of the invention provide useful OW circulators for optical communication and optical integrated circuits. Features of the OW circulator embodiments are compactness, high efficiency and compatibility with the optical fiber transmission lines and optical IC techniques. More detailed explanation of the invention will be made below, referring to the drawings.

BRIEF DESCRIPTION OF THE DRAWINGS

FIG. 4 is an elevation in section of another embodiment of the invention looking in the direction parallel to the common axis, the embodiment additionally having convergent dielectric coatings 13, 13' and 13" deposited on the respective reflecting mirrors 15, 15' and 15".

FIG. 5 is a schematic diagram showing the relationships of resonant electromagnetic field modes (solid lines) presumably existing in the MO structure, having radially and angularly dependent resonances, and relevant operating modes (broken lines) specifycing OW circulator actions. The first number of indices refers to the order of the resonant mode and the second the number of roots satisfying the radial requirement of resonance. The plus and minus signs indicate clockwise and counterclockwise rotating modes, respectively. The labeling of resonant and operating modes follows the one adopted usually in microwaves.

FIG. 6 illustrates angular electric field patterns for various operating modes, several of which were denoted by solid lines in FIG. 5. Contributing resonant modes to each operating mode are listed in the far right.

DESCRIPTION OF A PREFERRED EMBODIMENT

Figure 1:
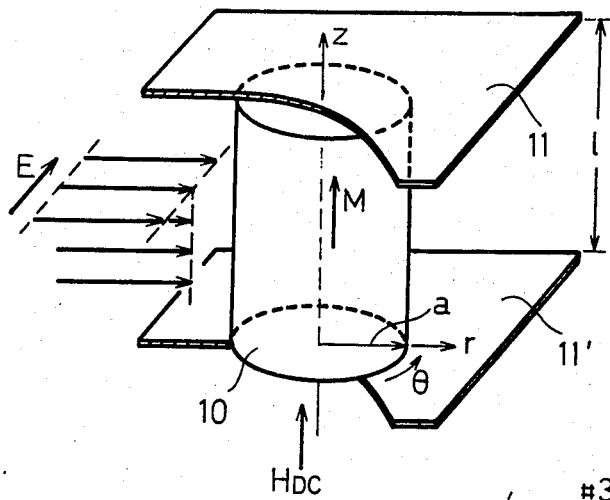
FIG. 1 illustrates (a) a perspective view of an elemental MO structure useful for explaining the basic performance of an OW circulator embodiment of the invention and (b) the angular pattern of the angular electric field component of the lowest resonant mode existing in the MO structure, where the incident light beam is indicated by arrows; E, the electric field component; M, the magnetization vector; and $H_{DC}$, the biasing magnetic field.
Figure 1:
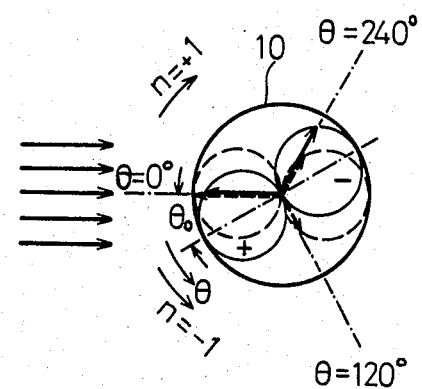

Referring to the drawings shown in FIG. 1a, the performance mechanism of an OW circulator is first explained. An MO structure 10 is a circular cylinder of the radius r and length 1, both of which are assumed to be longer than the light wavelength, the biasing magnetic field being applied to in the longitudinal direction (z-coordinate), so that the magnetization bector M lies in the z direction. The MO structure is placed between two conductive plates 11 and 11', which may be replaced with dielectric plates. Incident light beam irradiates the broadside of the MO structure, as the arrows indicate. This arrangement is an instance for the Voigt location. The MO effect then apears when the incident light beam is linearly polarized to have only the electric field normal to the z direction since the electric field interacts with the MO structure through the anisotropic splitting factor $\epsilon'/\epsilon_1$ of the tensor permittivity effectively in the transverse plane ($r\theta$ plane).

Assume that the horizontally polarized light beam is uniformly incident upon the MO structure 10, and a large amount of the incident beam penetrates into the MO structure to excite the electromagnetic (em) field mode of TE type, having the longitudinal magnetic field component, while the remainder of the beam is reflected from the surface of the MO structure. The TE type em fields inside the MO structure continue at the edge of the MO structure to the sum of the incident, reflected, and radiating waves outside the MO structure. Under the continuity condition, the basic performance of the OW circulator will be achieved, which is further explained by using the drawing of FIG. 1b. It is natural to thick that the uniformly incident light beam does not induce any longitudinal variation of the em fields. For the convenience of understanding, let us consider only the lowest resonant mode pair of $n = +1$ and $-1$ and their counter-rotating waves. If the MO material is free of biasing magnetic field, the tensor permittivity has zero nondiagonal element to induce no splitting of the two modes. Thus, the two modes are degenerate since the splitting factor $\epsilon'/\epsilon_1$ vanishes. The incident light beam will then produce in the MO structure a symmetrically electric dipolar pattern as indicated by a broken line in FIG. 1b, so that the incident light beam at $\theta = 0°$ produces the maximum radiating response at $\theta = 180°$, and the equal responses result at $\theta = 120°$ and $240°$. Unidirectional guiding of the light beam does not appear.

If the MO material is magnetically biased by $H_{DC}$, the magnetization produced gives rise to unequal non-diagonal elements of the tensor permittivity, and then clockwise and counterclockwise rotating waves for the modes of $n = +1$ and $-1$ dissolve the degeneracy, so that the electric dipolar patterns for the modes of $n = +1$ and $-1$ is rotated by $\theta_0$ at $\theta = 0°$, as indicated by the solid line in FIG. 1b.

Assume that the modes of $n = +1$ and $-1$, respectively, have resonant frequencies $f_+$ and $f_-$, $f_+$ being higher than $f_-$, and $f_s$ the frequency of the signal light lies between $f_+$ and $f_-$. The signal light power is transferred to the two modes. The mode of $n = +1$ at the angle $\theta = 0°$ has the maximum electric field lagging the maximum magnetic field and therefore has the lagging phase angle by $\theta_+$, thus the input impedance having inductive reactance component at $\theta = 0°$, while the mode of $n = -1$ has the maximum electric field leading the maximum magnetic field and therefore has the leading phase angle by $\theta_-$, thus the input impedance having capacitive reactance component at $\theta = 0°$. If the biasing magnetic field and the light signal frequency be adjusted to have $\theta_+$ and $\theta_-$ equal $\theta_0$, and if $\theta_0$ is 30°, the input impedance for the two modes is well matched to be purely real at $\theta = 0°$, and the input impedance at $= 240°$ also is matched to be purely real but the input impedance at $\theta = 120°$ becomes infinite, so that the light beam, incident on the side of $\theta = 0°$, is radiated with no dissipation to the direction of $\theta = 240°$, but does not emanate in the direction of $\theta = 120°$. The incident and radiating wave powers correspond to the magnitudes in the respective directions on the pattern indicated in the solid line shown in FIG. 1b. The plus and minus signs respectively denote in-bound and out-bound propagations of light waves. Thus, the incident beam at $\theta = 0°$ can be unidirectionally transmitted to the direction of $\theta = 240°$. Such unidirectivity is retained to perform circulation, in that when the incident light beam is applied to three different directions in the counterclockwise rotational turn, the output beam then emanates from the respective output sides in their samewise rotational turn. It is understood that such a crude setup as shown in FIG. 1a may act circulation if the incident light beam is narrow enough to satisfy the above-mentioned requirement for getting impedance matching. The light beam with broader width than the diameter of the MO structure may less couple with the MO structure, and that much coupled light power is transmitted toward the output, the large amount of the light power being reflected away from the surface of the MO structure. The broad light beam is thus partly penetrated and mostly reflected on the surface of the MO structure, and the radiating light wave emanates in a broad angle in the vicinity of $\theta=240°$. In addition, incomplete isolation will result in the direction of $\theta=120°$ since a small amount of the light power still emanates in this direction.

It can be said further that the incident light beam with a broad width may excite higher-order modes having resonances in the radial and angular directions in the MO structure to inevitably induce undesirably spurious radiations around the MO structure. To get better performance of an OW circulator, uses are made of effective guiding couplers such as convergent lenses to effect adequate coupling of input and output ports, and of reflecting mirrors positioned at counter-positions to three ports to recouple the reflected light waves and spurious radiations with the MO structure and eventually to enhance desired radiations toward the output port.

Figure 2:
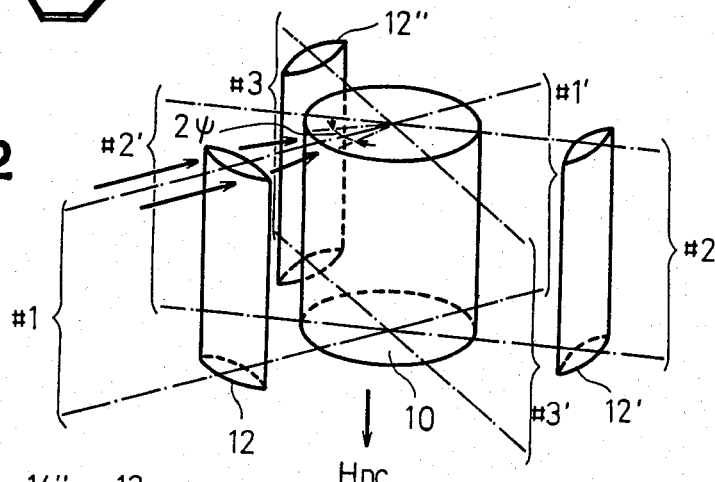
FIG. 2 is a view in perspective of an original setup of an OW circulator having a circularly cylindrical MO structure 10 and three cylindrical lenses 12, 12' and 12" located at 120° apart from each other.

It is convenient to define input, isolating, and output ports in the drawing as will be shown in FIG. 2, and furthermore, the respective sides of the MO structure facing three ports as incident, isolating, and emanating sides. When the input port is taken, for instance, to #1 port at the angle of $\theta=0°$, #2 and #3 ports become the output and isolating ports, respectively, in the forward circulation, or vice versa in the opposite circulation.

An OW circulator embodiment of the invention is illustrated in FIG. 2. In this embodiment, three of one-dimensional lenses 12, 12' and 12", which are symmetrically placed at 120° apart from each other, act as wave-guiding couplers to make incident plane waves irradiate the MO structure on a narrow coupling angle $2\psi$, and also to lead radiating waves to external waveguiding systems. Conductive or dielectric plates which are attached to the top and bottom of the MO structure 10, and the magnetic biasing means which applies magnetically biasing field to the MO structure are not illustrated in the same figure.

Figure 3:
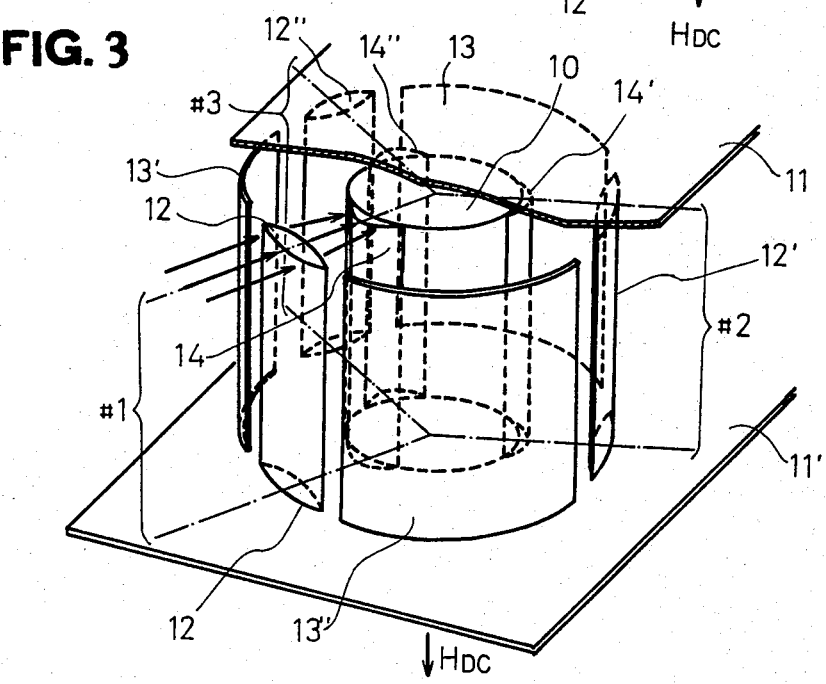
FIG. 3 is a view in perspective of an embodiment of the invention having three cylindrical lenses 12, 12' and 12", three dielectric coatings 14, 14' and 14" deposited on the MO structure 10, and three reflecting mirrors 13, 13' and 13" each of the three being located at 120° apart from each other.

Another embodiment of the invention is shown in FIG. 3. This embodiment comprises three one-dimensional lenses 12, 12', and 12" used for three ports, three concave mirrors 13, 13' and 13" symmetrically placed at counterpositions of the three ports, and the MO structure 10 positioned at the center of the embodiment, with two plates of conductor or dielectric, 11 and 11'.

Incident light beam on the MO structure 10 is partially reflected. To eliminate the reflected waves from the surface, impedance matching is necessary for the incident light beam on the incident side, and also for the radiating waves from the emanating side. The dielectric films 14, 14' and 14" are arranged to cover effectively the respective sides of the MO structure over the coupling angles, and the thickness and refractive index of the film relate to impedance matching. If two resonant modes of $n=+1$ and $-1$ play an important role in circulation, the matching impedance for these modes' operation is to be larger than the surface impedance of the MO structure so that the refractive index of the dielectric film is chosen to be lower than that of the MO material, and the film thickness is to be thinner than a quaterwavelength of the light wave. A multiple layered film or an inhomogeneously coated film having a graded index profile may be useful for getting broadband operating characteristics.

Reflecting mirrors 13, 13' and 13" have two roles. One role is to prevent power losses by reflection, and the other to make the reflected waves recouple with the MO structure for improving performance characteristics. In fact, higher-order resonant modes cause the radiating waves to emanate in undesired direction amid between two parts, as will be shown in FIGS. 6 and 7, and also several operating modes to which various resonant modes contribute have the the maximum responses of radiation in the directions not only for three ports #1, #2, and #3 but also toward their respective counterpositions #1', #2' and #3'. The radiations directed toward the counterpositions can be reflected by the mirrors 13, 13' and 13" to recouple with the MO structure, so that resonant modes of interest and their operating mode can be adjusted to have the maximum response in the desired direction. The performance of the OW circulator embodiment can be improved.

The incident light beam is partially reflected from the MO structure even in the vicinity of $\theta=0°$, and a portion of radiated waves emanates in the direction of $\theta=180°$. The reflected and radiated waves involve horizontally and perpendicularly polarized wave components, due to the Cotton-Mouton effect and transverse Kerr effect. Such reflected or radiated waves are turned back by the mirrors 13, 13' and 13" to irradiate the MO structure and eventually a TM mode type em fields having the longitudinal electric field component can be excited in the MO structure. Through successive reflections between the MO structure 10 and reflecting mirrors 13, 13' and 13", two kinds of TE and TM modes coexist. It is noted that TE and TM modes are generally defined in a circular hollow waveguide, and these are considered to be akin to EH and HE modes in an open type dielectric waveguide. Rigorously speaking, EH and HE modes should be taken into consideration. Nevertheless, in terms of TE and TM modes are the disclosure of the invention made for the sake of simplicity. The two resonant modes have different eigenvalues and distinct properties, in that the MO structure can strongly act on the TE modes through its tensor permittivity to make large an eigenvalue separation and a phase difference between clockwise and counterclockwise rotating waves.

A cross-sectional view of still another embodiment of the invention is shown in FIG. 4. This embodiment additionally comprises three dielectric films 15, 15' and 15" coated on the reflecting mirrors 13, 13' and 13", respectively. Each dielectric film is made inhomogeneously thick to act such a focusing effect on the reflecting light waves as brings about additive resonances to the primary resonant modes that the incident light beam has excited in the MO structure. Thus intensified resonant modes can be adjusted to achieve broadband impedance matching and circulation of the OW circulator embodiment. It is possible to incorporate wavelength selectivity in the dielectric films 15, 15' and 15", so as to get better performance advantage. The reflecting mirrors 13, 13' and 13'' are formed into one of circular cylinder, elliptic cylinder, spheroid, and other complex surfaces. As a matter of course, a dielectric film of a constant thickness may be useful rather than that of an inhomogeneous thickness.

Still another embodiment of the invention is one that utilizes polarizing material for such dielectric films 15, 15' and 15''. The reflecting mirrors with such polarizing effect can selectively suppress the TM type resonant mode that is harmful to the circulator performance.

Simple theoretical background will be explained for the sake of understanding the above-disclosed embodiments of the invention. The TE type resonant modes are defined by the condition of electrically short-circuited termination at the periphery of the MO structure, under the additional condition of non-propagation in the axial direction of the MO structure 10. They are diagrammatically shown in FIG. 5 regarding various orders for the ith root of the radial resonance.

It is obvious that there are a number of radially dependent resonances, because of a sufficiently large diameter of the MO structure in the comparison with the wavelength of the incident light beam. Angularly dependent resonant modes of various orders for only the ith root of the radial resonance are therefore considered. FIG. 5 illustrates the relationships of radial wave number $k_e r_0$ and anisotropic splitting factor $\epsilon'/\epsilon_1$ for the clockwise and counterclockwise rotating modes that are denoted by the plus and minus signs, respectively. Each mode group of the ith root appears with almost a $\pi$ radian interval for $k_e r_0$ from the group of the i-1-th root, and has almost the same intermodal relationships as being shown in FIG. 5, but the same order mode of different roots do not concur at any specific operating point with the common condition for the light wavelength and biasing magnetic field.

The OW Y circulations to which these resonant modes contribute are described in terms of operating modes that are plotted superimposed by broken lines on the resonant mode curves. Mode 1 is the lowest order circulation in which two resonant modes of n= +1.i and −1.i play the important roles, displaying the electrically dipolar standing wave pattern in the circumference of the MO structure. Mode 1A is the second order circulation in which two modes of n= −1.i and +2.i play their roles, having a deformed electrically dipolar pattern. The mode 1A includes two different circulations: forward and opposite circulations, according to deformations of the electric dipolar patterns to the directions of 120° and 240°, respectively. Modes 1A(+) and 1A(−) are thus discriminated. Mode 2 takes various quadrupolar patterns, passing in succession intersections of mode curves of n= +2.i and −2.i, n= −2.i and +3.i, n= +3.i and −1.i, and so on. The mode 2 changes senses of circulation from 240° to 120°, and vice versa, in passing these intersections. Mode 2A is a circulation in which modes of n= −2.i and +4.i play their roles, displaying a deformed quadrupolar pattern, so as to radiale the light power in the direction of 120° or 240°. Modes 2A(+) and 2A(−) can be discriminated. Other higher-order operating modes than these may be induced with various higher-order resonant modes of different roots, but their intervention in an important circulation can be suppressed in circulation adjustments. Various standing wave patterns of these operating modes are closely related with peripheral standing wave patterns produced around the MO structure.

The role of the reflecting mirrors 13, 13' and 13'' and those with the dielectric films 15, 15' and 15'' coated thereupon is to turn back to the MO structure the radiating emanating in the directions opposite to three ports. Mode 2A, for instance, takes a deformed quardrupolar pattern with four maxima of radiation, two of which are directed to counterpositions of three ports to fall into dissipation, but can be turned back to recouple with the MO structure. With these radiations recoupling with the MO structure, circulations of mode 2A and others can be improved. It is, of course, important to make impedance matching between the wave impedance of the incident beam and the surface impedance of the MO structure through the dielectric film coated on each of three sides of the MO structure. The dielectric films 14, 14' and 14'' thus used are usually thinner than the light wavelength.

Figure 7:
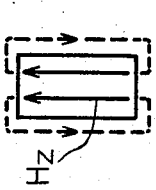
FIG. 7 shows electric and magnetic field patterns of resonant modes of various orders with longitudinal variations in sections of the MO structure looking in the directions parallel and perpendicular to the common axis, and radiating field patterns in its longitudinal section.

For the case of an ideally horizontally polarized plane wave incident on the input port, the resonant modes existing in the MO structure 10 may have only radial and angular dependences, which is really sufficient for phenomenological explanation of elementary circulations. However, laser beam is of two-dimensional gaussian waves. When it irradiates the MO structure on the incident side in the middle, the situation differs in the way of excitation. The reason is that at first the longitudinal variation of the em fields on the surface of the MO structure will induce resonant modes with three dimensional dependences on the radial, angular, and longitudinal directions, and secondly, the gaussian waves have two rectilinearly polarized field components which flow electric and magnetic currents on the surface so that a TE mode (H mode) having the longitudinal magnetic field component and a TM mode (E mode) having the longitudinal electric field component both can excited. Only the TE mode is important from the viewpoint of circulation and the TM mode does not effectively couple with the MO structure. To emphasize the TE mode and to suppress the TM mode in the MO structure, a horizontally polarized plane waves are preferred. Use of the reflecting mirror with polarizing film or the like dielectric films is necessary. Nevertheless, the resonant modes still have the longitudinal variation to cause the radiating field pattern to split in the longitudinal section. It is also the case with the incident gaussian beam irradiating the MO structure at its middle of $z=\frac{1}{2}$. Resonant modes with anti-symmetric longitudinal magnetic field component can be excited. FIG. 7 illustrates longitudinal magnetic field components, transverse electric field patterns and radiating field patterns, regarding the resonant modes with the lowest-order radial resonance.

Case A in the FIG. 7 is such that the longitudinal magnetic field component is almost uniform in the vicinity of $z=0$, the longitudinal wave number $k_z$ being zero, and the electric field patterns in the transverse section at $z=0$ seem to be similar to those shown in FIG. 6. The radiating field pattern tends to have a single lobe in the far distance. Case B is such that the longitudinal component of the magnetic field is symmetric, having the wave number $k_z = \pi/l$, and since the electric field pattern still has the same as the case A, the radiating field pattern tends to split in two lobes. Case C is such that since there dominates the resonant mode having the wave number $k_z = 2\pi/l$, the electric field pattern in the transverse section at $z=0$ changes triply in signs as it goes along the z direction, the radiating field pattern correspondingly tending to split in three lobes.

Reentrant light waves in the MO structure, after reflection from the reflecting mirrors, are considered to bring about TE and TM modes since the incident light beam possesses two rectilinearly polarized plane wave components, and the reflected and radiated waves from the MO structure still retain the rectilinearly polarized plane waves, due to the Cotton-Mouton, transverse and longitudinal Kerr effects. In short, radiating waves produce various lobes having two dimensional variations in the transverse and longitudinal sections, no matter whether the incident light beam is of gaussian wave modes or not, and also, reentrant light waves, after reflection from the reflecting mirrors, induce both TE and TM modes in the MO structure. The radiating fields of the two modes will build up in the direction where they are in phase and cancel out in the direction where they are out of phase. The resultant radiating field pattern therefore splits in complicate lobes of radiation. These radiations can be arranged to direct the main lobe toward the output, by adjusting reflecting mirrors and convergent lenses. In other words, the resultant radiating field pattern toward the output port contains higher-order gaussian waves that diversify the dominant lowest-order gaussian wave. The above-disclosed OW circulator embodiment of the invention needs to have the reflecting mirrors, dielectric films coated thereupon and convergent lenses, in order to predispose the modal content inside the MO structure, thereby the desirable gaussian waves dominating over the output emanating field. To this end, a spherical, spheroical, elliptic or other two-dimensional surface for a reflecting mirror is used to guide the side lobes in the longitudinal section to couple with the MO structure.

Figure 8:
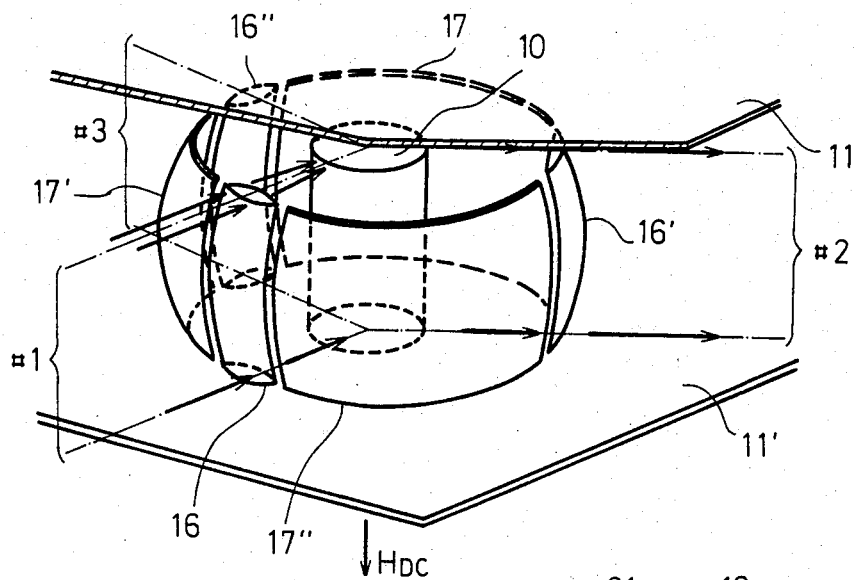
FIG. 8 is a perspective view of another embodiment of the invention having three convergent lenses 16, 16' and 16'', and mirrors 17, 17' and 17''.

FIG. 8 illustrates another embodiment of the invention that may fill the above-mentioned requirements for an OW circulator operation. This embodiment comprises the two-dimensional lenses 16, 16' and 16", reflecting mirrors 17, 17' and 17" formed in a two-dimensional concave surface, and the MO structure 10 placed at their common center. They constitute a resonator of a circular type. A biasing magnetic field is indicated by $H_{DC}$. Use of these two-dimensional mirrors and lenses features this embodiment. Application of dielectric films 14, 14' and 14" for impedance matching and polarizable dielectric films 15, 15' and 15" as disclosed in FIG. 4 is also useful in getting better circulator action.

Figure 9:
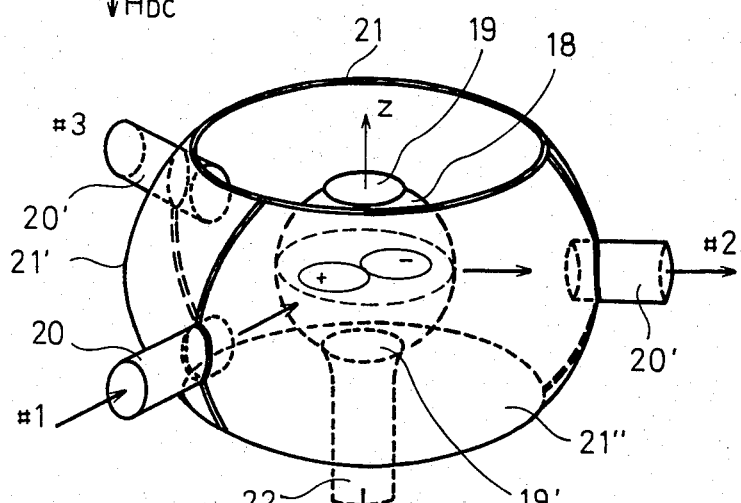
FIG. 9 is a view in perspective of still another embodiment of the invention, having a spherical MO structure 18, three cylindrical lenses 20, 20' and 20'', and confocal mirrors 21, 21' and 21''.

FIG. 9 demonstrates still another embodiment of the invention, in which three rotational spheroidal reflecting surfaces and a spherical MO structure 18 positioned at the common center constitute an OW resonator to act as an OW circulator, having three ports through three cylindrical lenses 20, 20' and 20" symmetrically located in the periphery of the mirrors on the equatorial plane. The MO structure 18 has conducting films 19 and 19' attached to its top and bottom to prevent unnecessary radiations in the axial direction. A supporter 22 is for holding the MO structure. This OW circulator embodiment is rather convenient to make an incident laser beam of a small spot size appropriately couple with a small spherical MO structure. Resonant modes in the MO structure are different from those in the cylindrical MO structure as shown in FIGS. 1 to 8, but can be phenomenologically explained by the analogy to those above-disclosed, as far as the resonant modes are seen on the equatorial section of the MO structure.

The transverse electric field pattern for the resonant mode of $TE_{011}$ type on the equatorial section is drawn in FIG. 9. The incident light beam enters into the lens 20 as shown by arrows and emanates toward the lens 20'. In this embodiment, application of such dielectric films for getting impedance matching and polarizable films for suppressing higher-order modes' contributions as disclosed in FIG. 4 is also useful. In the above-disclosed embodiments of the invention, incident light beams are commonly assumed to be of smaller than or almost equal to the dimensions of the MO structure. If a light beam has larger spot size than the dimensions of the MO structure, convergent lenses of a large aperture are necessary for getting tight coupling, but use of the strongly convergent lenses is probably to cause the highly concentrated light power to rise nonlinear effect in the MO material.

Figure 10:
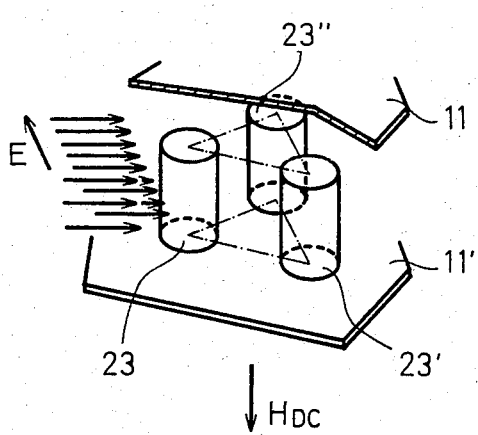
FIG. 10 illustrates (a) a perspective view of a collocated MO column system, having only three MO columns 23, 23' and 23'', with two ground planes 11, 11' covering the column system, (b) and (c) ideal performances having the incident light beam irradiating the apex and side line of the triangle of the columns, respectively, the radiating waves emanating in the direction indicated by (II); (d), (e) and (f) instances of incomplete performances: (d) shows the case that when the light beam is incident on the apex of the triangle ABC, if the light wave is radiated in the direction of 150° after passage through a column, then the light wave is directed to the direction of 120° after passage through two MO columns; (e) and (f) show the cases of another incomplete performances having a small amount of the light wave power passing straight after passage through a column.
Figure 10:
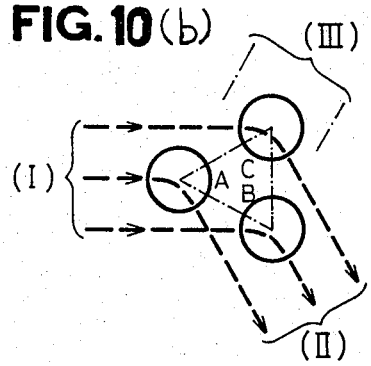
Figure 10:
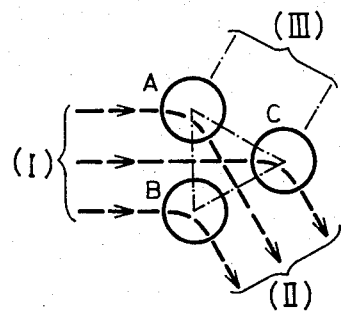
Figure 10:
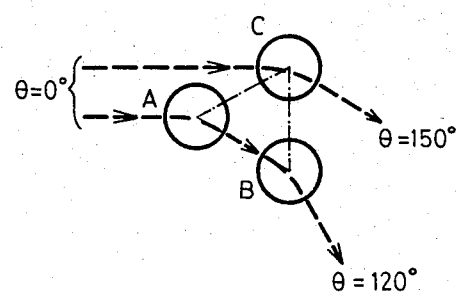
Figure 10:
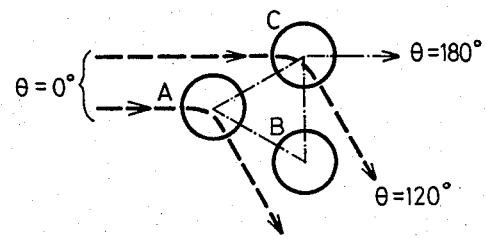
Figure 10:
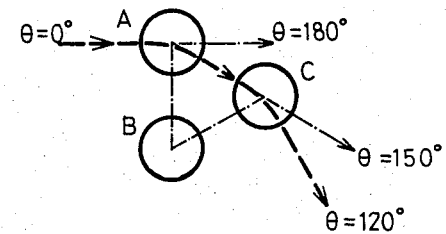

Other arrangement alternative to the strongly convergent system is considered. The following example as shown in FIG. 10a discloses another embodiment of the invention that utilizes a composite column system consisting of plural numbers of MO posts to accept incident light beam of the large spot size. The column system is to be covered by two ground planes 11 and 11', or to be planted within dielectric slab guide junction.

A basic arrangement of three posts 23, 23' and 23" in a column system is shown in FIG. 10a. Each post in the column system may be of a diameter larger than the light wavelength, but is small enough in comparison with the spot size of the light beam. Three posts are positioned at the apices of an equilateral triangle, in order that the whole incident light beam may completely couple with the three posts. Two conductive plates cover the column system and the biasing magnetic field $H_{DC}$ is applied to the direction indicated by an arrow. There are two cases for incidence of the light beam. The incident light beam irradiates the column system in the direction from an apex or a side of the triangular configuration of the three posts.

Now assume that the operation of mode 1A(+) only is well adjusted. An elemental light beam, incident upon each post, can be transmitted in circulation toward the direction indicated by solid broken lines. If the incident light beam irradiates the column system form the direction (I), elemental light beams are rotated in the respective posts to emanate in the direction denoted by (II). No light beam appears in the direction denoted by (III), as shown in FIGS. 10b and c. The above-disclosed performance of the column system is actually considered as a limiting case, since the MO anisotropic splitting factor $\epsilon'/\epsilon_1$ is too low to achieve sufficient circulation in each post in comparison with the ferromagnetic anisotropic splitting factor $k/\mu$ in the microwave circulator operation. The low splitting factor implies that circulation of mode 1A(+) is incomplete, so that the major radiating light waves do not appear in the direction of 120°. Other reasons for the incomplete circulation are that firstly, clockwise and counterclockwise rotating waves do not sufficiently split due to the low value of the MO anisotropic splitting, secondly, both TE-type and TM-type resonant modes coexist, and thirdly, other higher-roder modes intervene in desirable circulation.

FIG. 10d illustrates another instance that an elemental light beam is rotated toward the direction of 150° after passage through post C, but is rotated toward the direction of 120° after double passage through posts A and B. Only the elemental light beam emanates in the direction of 120° and the remainders of the light beam in the direction of 150°. FIG. 10e illustrates another instance that the incident light beam is mainly circulated in the direction of 120° but the remainder emanates straight in the direction of 180°. FIG. 11f also illustrates still another instance that the incident light beam is completely rotated to the direction of 120° after passage through two posts, with the remainders still emanating in the directions of 180° and 150°. It is remarked that the major radiation to the direction of 150° from the post A is led to couple with the post C so as to radiate in the direction of 120° after passage through the post C. After all, the light waves emanating in the directions of 180° and 150° are unnecessary for better circulation.

As it is understood from several examples for the incomplete circulations as shown in FIGS. 10d to f, the circulator performance with the column system disclosed in FIG. 10a is still insufficient. Improvement of the circulator performance is attempted by making use of a multiple column system (MC system) in which a number of MO posts are assembled. The incomplete circulation due to the unnecessary radiations is simproved since the unnecessary radiations are successively coupled with multiple posts to have the major radiating waves emanate in the direction of 120°.

Figure 11:
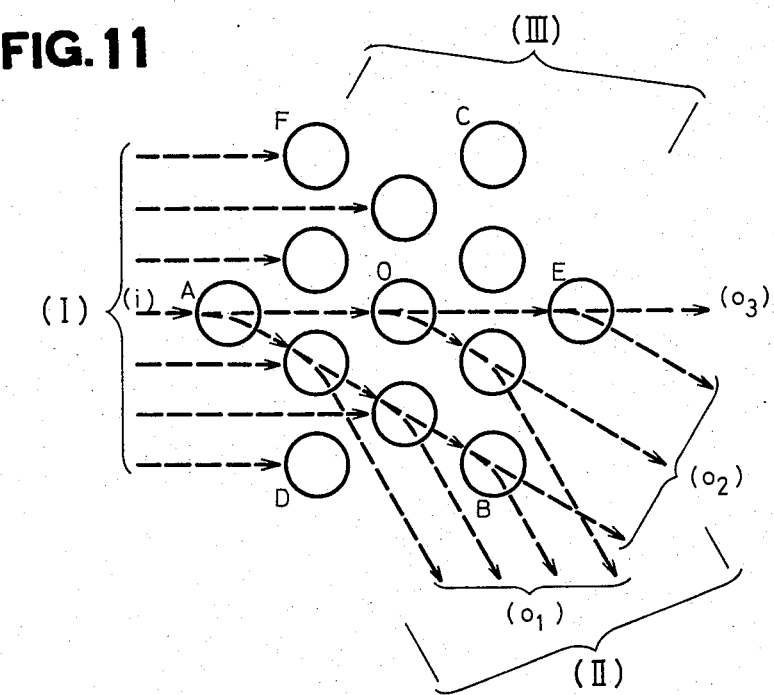
FIG. 11 illustrates the performance principle of a multiple MO column system.
Figure 12:
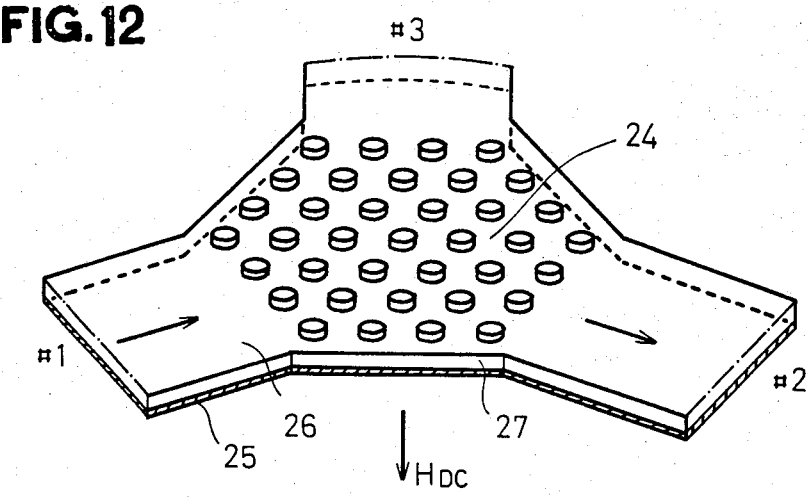
FIG. 12 is a perspective view of the above-disclosed embodiment of the invention comprising the multiple MO column system as in an integrated circuit configuration, each element being a circular column or a circular disk.

FIG. 11 illustrates a MC system arranged in the hexagonal configuration. This MC system is composed of two triangular column systems counterpoised with each other. Each one of two systems ABC and DEF includes a number of triangular unit system as shown in FIG. 10a. Incident light beam is led to the MC system from the direction denoted by (I). Assume that an elemental light beam is incompletely rotated after passage through each post. The elemental light beam marked by (i) is incident upon post A, the major portion of the light beam is rotated to the right for $\theta=150°$ and enters into the second post. The minor portion of the light beam passes through the post A in the direction of 180° and enters into post O. The same circulation occurs at each post. The elemental light beam (i) is finally divided into three portions, the major radiations denoted by ($0_1$), the intermediate radiations denoted by ($0_2$), and the minor radiations denoted by ($0_3$) the respective radiations being compared with one other in the decreasing magnitude order of the light wave power, that is ($0_1$)>($0_2$)>($0_3$). Therefore, the incident light beam is circulated to the direction (II) from the direction (I). The radiating waves ($0_2$) and ($0_3$) are negligible, together with other radiations that are not referred in disclosure of the invention, but these waves can be guided appropriately to the output port. To this end, such an MC system is made submerged in a dielectric slab guide junction. Submerging of the MC system in the dielectric slab guide has roles to effectively lead the radiating waves to the output port and to make impedance matching for the incident light beam to couple with each post. According to the above-mentioned considerations, another circulator embodiment of the invention is shown in FIG. 12.

The embodiment utilizes an MC system consisted of thirty seven MO posts. Each MO post is of a circular cylinder or a circular disk. The MC system 24 is incorporated on a conductive plate 25 or a dielectric plate and is submerged in a dielectric material having a slab guide configuration. The incident light beam is led through the dielectric slab guide 26 to the entrance #1 of the MC system 24. The radiating waves are led to the exit port #2. Unnecessary radiations from the MC system still have the least amount of the incident light power that is kept away from leaking out by side walls 27 with a dielectric film. The dielectric film can be made in a graded index film or a reflecting film. No radiation is presupposed in the axial direction. There is, however, a lack or a flaw in the MC system that may arise random radiation inside the MC system. The MC system is therefore to be completely covered by a reflecting film. The biasing magnetic field $H_{DC}$ is applied to in the direction normal to the ground plate 25.

Figure 13:
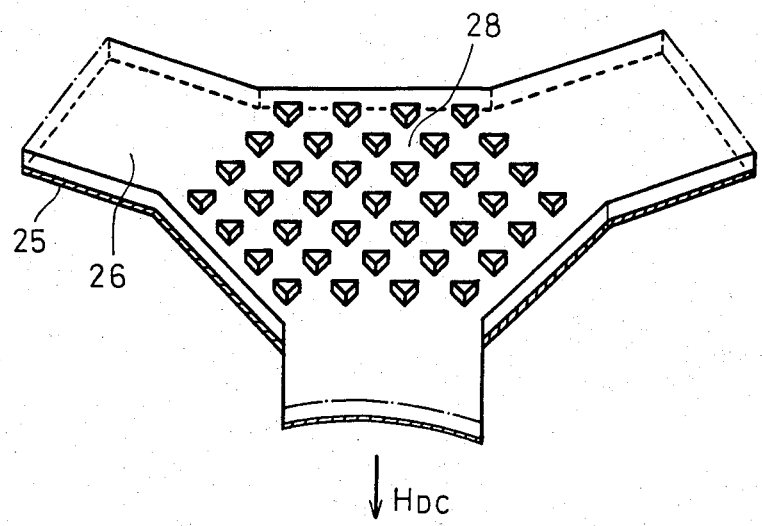
FIG. 13 is a perspective view of another embodiment of the invention, each element being a triangular MO structure.

Another embodiment of the invention is shown in FIG. 13. The embodiment utilizes an MC system assembled with triangular MO elements. The circulator operation of this embodiment is similar to that of the MC system disclosed in FIG. 12. Biasing magnetic field is applied perpendicularly to the ground plate 25 as indicated by $H_{DC}$.

Figure 14:
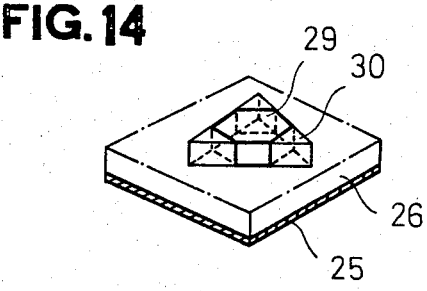
FIG. 14 is a perspective view of a column incorporated in the above-disclosed embodiment of the invention.

FIG. 14 illustrates a hexagonal MO element used for an MC system. The MO element has three triangular dielectric tips attached to three faces of the hexagon, in order to make impedance matching in three directions corresponding to three ports. By use of this exagonal MO element, better circulator performance may be expected. The above-disclosed circulator embodiment of the invention are of course applicable to an OW circulator embodiment of a multiple port configuration, such as four-port circulator, five-port circulator and so on.

According to the disclosure of the embodiments of the invention, we can realize compact, and highly efficient optical wave circulators compatible with optical fiber transmission lines and optical integrated circuits for optical communication.

What we claim is:

1. An optical wave circulator comprising
a magneto-optic cylindrical structure made of magneto-optic material having optical anisotropy under biasing magnetic field to act given magneto-optic effects on signal light beam, said magnetic being optic structure being positioned on the common axis,
plural numbers of optical guiding couplers for guiding said light beam, each coupler being placed in rotational symmetry around said common axis,
said plural numbers of reflecting mirrors being counterpositioned to said couplers in said rotational symmetry around said common axis,
two plates supporting said magneto-optic structure and said reflecting mirrors,
and means for magnetically biasing said magneto-optic structure in the direction parallel to said common axis.

2. An optical wave circulator as defined in claim 1, wherein said guiding coupler is a convergent one-dimensional lens, and said mirror is a concave one-dimensional mirror.

3. An optical wave circulator as defined in claim 1, wherein said guiding coupler is a convergent one-dimensional lens, said mirror is a concave one-dimensional mirror, and dielectric films are coated on the respective sides facing said couplers and on the respective surfaces of said mirrors.

4. An optical wave circulator as defined in claim 1, wherein said guiding coupler is a convergent two-dimensional lens, and said mirror is a concave two-dimensional mirror.

5. An optical wave circulator as defined in claim 1, wherein said magneto-optic structure is of a spherical configuration, said coupler is a cylindrical lens, and said mirror is of a concave two-dimensional surface.

6. An optical wave circulator comprising a magneto-optic column system having at least three magneto-optic elements positioned equidistant from each other on the common plane, plural numbers of optical guiding couplers symmetrically extending away for guiding optical signal waves from said column system, a ground plate supporting said column system and said couplers, and means for magnetically biasing said column system in the direction normal to said common plane.

7. An optical wave circulator as defined in claim 6, wherein said column system is covered on the top and side by dielectric films.

8. An optical wave circulator as defined in claim 6, wherein said column system is submerged in a guiding dielectric slab and covered by a reflecting film.

* * * * *